Nov. 22, 1960 P. WARE 2,961,592
AUTOMATIC PILOT FOR MARINE VESSELS
Filed July 20, 1954 3 Sheets-Sheet 1
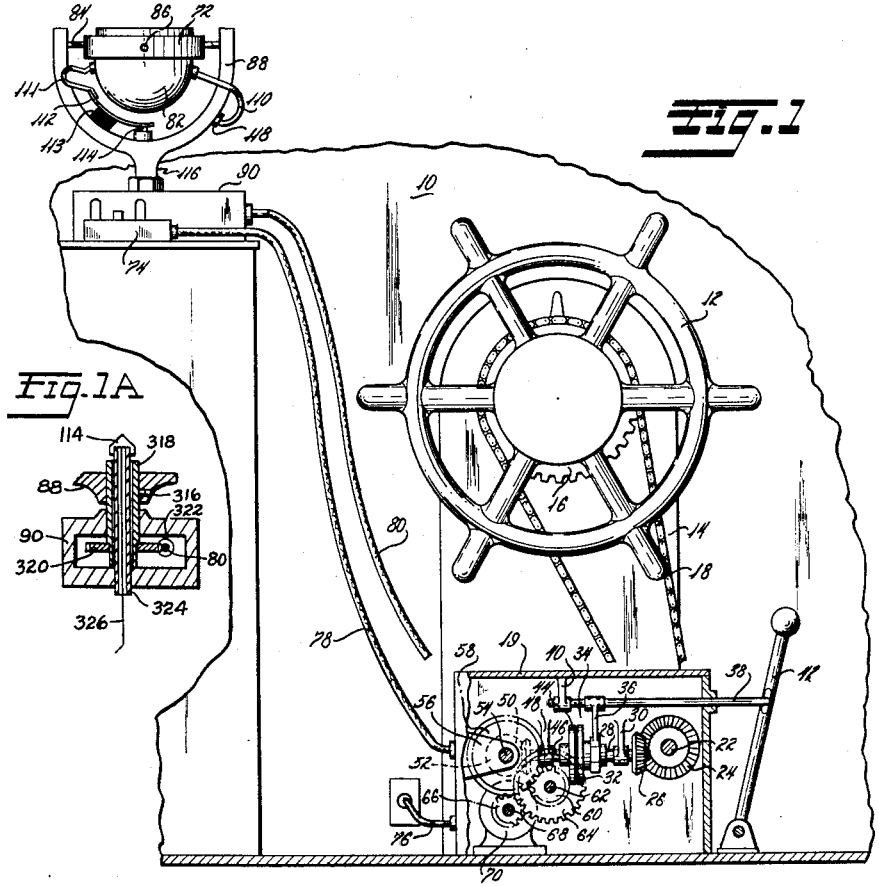
Fig.1
Fig.1A
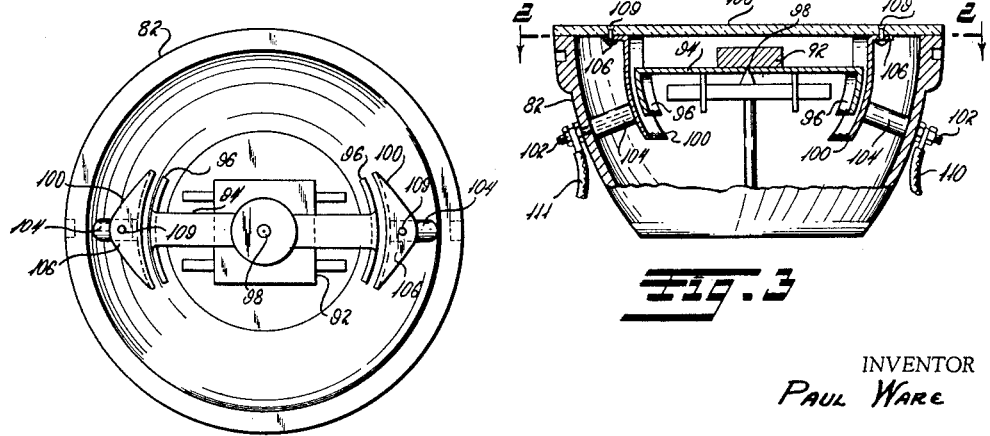
Fig.2 Fig.3
INVENTOR
PAUL WARE
BY Strauch, Nolan & Riggins
ATTORNEYS

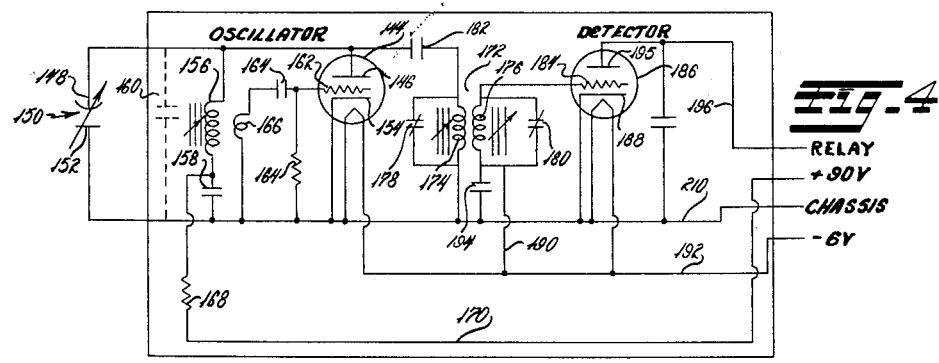
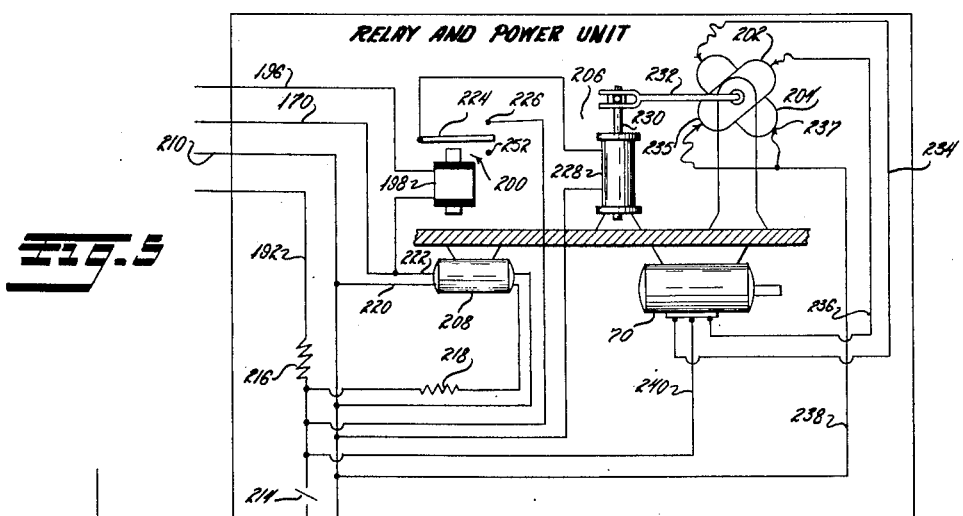
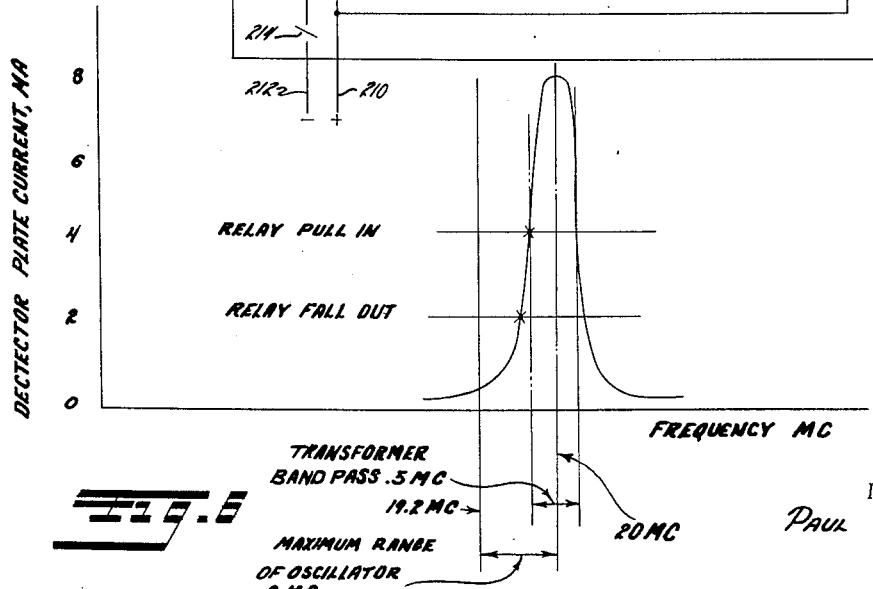
INVENTOR
PAUL WARE

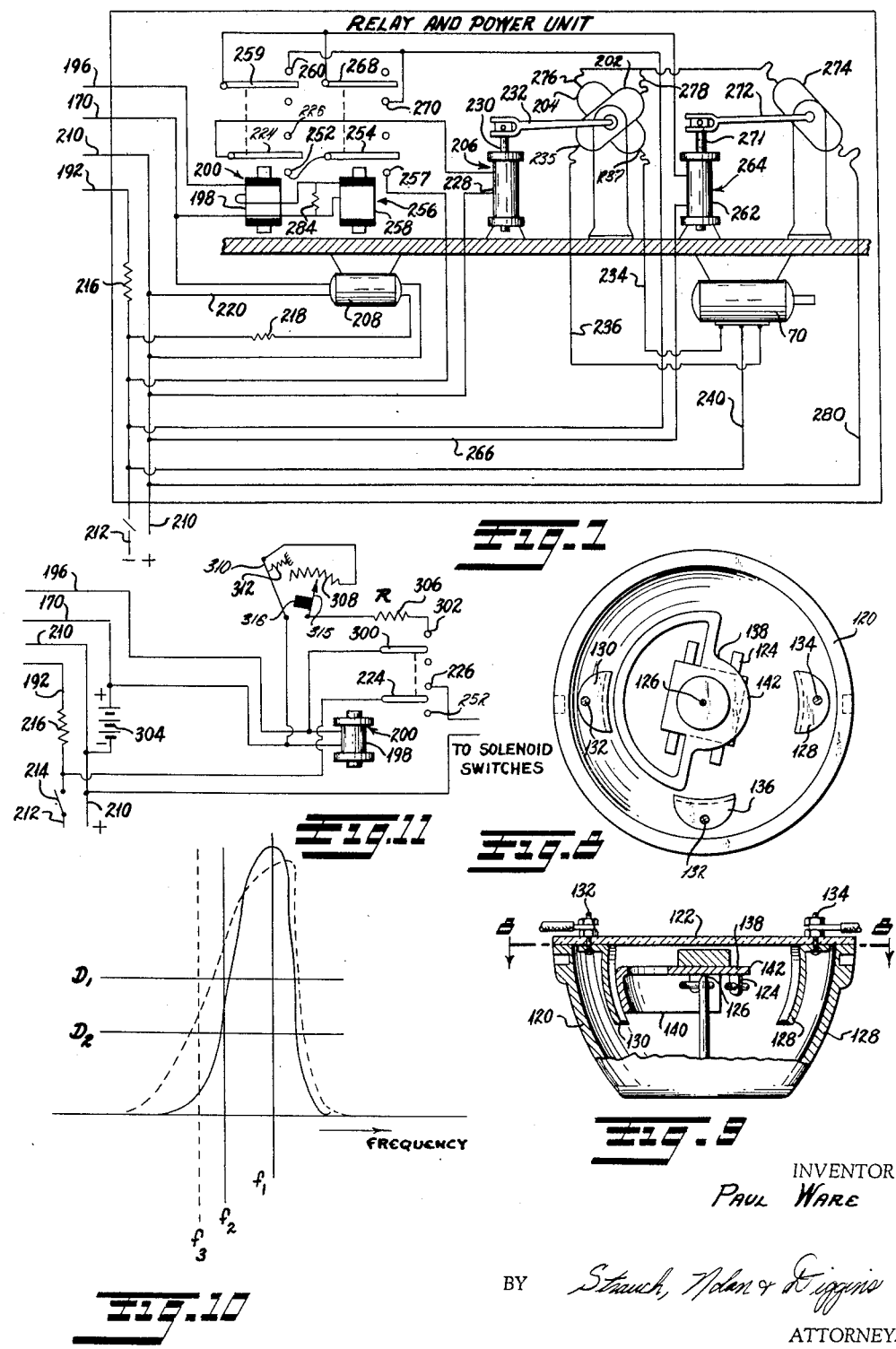

United States Patent Office 2,961,592
Patented Nov. 22, 1960

2,961,592

AUTOMATIC PILOT FOR MARINE VESSELS

Paul Ware, Miami, Fla., assignor to Ware Marine Products, Inc., Miami, Fla., a corporation of Florida Filed July 20, 1954, Ser. No. 444,413

26 Claims. (Cl. 318—489)

The present invention relates to an automatic pilot for use in maintaining marine vessels on a selected course and more particularly to a simple inexpensive compass actuated automatic steering mechanism for marine and like vessels of all sizes that might be properly steered manually.

While various devices of this general character have heretofore been proposed, they have been either expensive or embodied complicated electrical circuitry and components utilizing either mechanical contact devices or photo-electric cells in the compass structure for the electrical pick-off of a control signal.

The compass pick-off structures now in use mostly on smaller craft employ either a cat-whisker contact or a photo-electric cell. The former has the disadvantage of using extremely small size wire in the cat-whisker to avoid imposing a drag on the desirable free compass action the consequence that extremely feeble currents must be employed in the compass circuit. The fine wires and weak currents in the pick-off make it difficult to manufacture and subject the system to the hazard of salt spray and dampness on the compass glass, insulators and wiring with the result that performance is adversely affected.

The principal disadvantage of the photo-electrical cell pick-off is its requirement for better electric power supply regulation than is usually available on board medium size or smaller marine craft and special means are required to maintain the voltages constant to afford reliable operation.

In addition to the foregoing there have been attempts at providing variable capacitances as pick-up devices. The variable capacitances utilized involved one element fixed to the compass bowl and another fixed to the movable magnet structure. Leads were taken from these two elements and connected to rather complex control devices. An expensive means was necessary for connection to the movable element of the condenser. Only a single tuned circuit, of which the compass condenser was a part, was employed between a fixed frequency oscillator and detector.

The small detector output necessitated amplification and the complete automatic pilot which resulted was complex and costly and required expert electronic maintenance.

It is accordingly a primary object of this invention to provide an automatic pilot having a condenser pick-off device with no electrical connection to the movable element and with a variable frequency oscillator controlled by the pick-off condenser.

It is a further primary object of the invention to provide a detector energized directly from such oscillator and directly energizing a relay to cause reversal of a wheel or helm control motor.

It is another object of the invention to provide a follow-up system for the foregoing oscillator-detector unit which does not necessitate the use of additional tubes or electronic components.

It is another object of the invention to provide a compass controlled condenser which serves as part of the tank capacitor of a variable frequency oscillator which directly feeds a detector having a rudder control relay operated by its plate current.

It is another object of this invention to provide an automatic pilot having an electrical compass pick-off device comprising a variable element tuning condenser the movable or inner element of which is associated with the pivoted magnetic assembly and the stationary or outer elements of which are disposed in annularly spaced relation to the inner element and are associated with the bowl of the compass, a directly connected oscillator tube circuit providing an output frequency varying directly in accord with tuned characteristics of the compass condenser, a detector tube circuit energized by the output of the oscillator circuit, a simple inexpensive plate circuit type relay directly connected to and responsive to the output of the detector circuit for controlling the electrical supply through reversing switches to a reversing type electric motor adapted through suitable gearing, a sprocket and chain drive to alternately drive the wheel or helm of the vessel in opposite directions and through a suitable gear drive system and at the same time effect the necessary follow-up drive of the compass.

Still another object of the present invention resides in the provision of a novel electrical control circuit for a magnetic compass comprising a variable condenser tuning circuit made up of a plurality of diametrically opposed, spherically curved outer plates which are suitably connected to an oscillator circuit through electrical leads sealingly passing through the compass bowl and at least one mating spherically curved inner and relatively movable plate mounted on the pivoted magnetic assembly of the compass in a manner to be disposed normally in coaxial, annularly spaced relation to said outer plates and arranged to cooperate with the outer plates and proportionally vary the frequency in the oscillator circuit in accord with the compass bearing irrespective of the relative horizontal relationship of the plates.

Still another object of the present invention resides in the provision of an automatic marine pilot utilizing a built-in compass variable condenser as the control element for varying the current in an oscillator-detector tube circuit operable at a current magnitude adequate to effectively directly energize a conventional plate circuit relay arranged to control the direction of current flow to a reversing type electrical motor for driving the steering wheel of the vessel.

A further object of the present invention resides in providing a novel relay and power unit for use in an automatic marine pilot or the like comprising a simple two position plate circuit relay, an electrical circuit including a switching solenoid energized by said relay, a pair of switches controlled by said solenoid and connected to alternately supply current to opposed supply lines and a reversing type motor connected to the opposed supply lines and adapted to drive the steering wheel of a marine vessel alternately in one direction and then another to maintain the vessel on a selected course.

Still another object of the present invention resides in providing a relay and power unit for use in an automatic marine pilot or the like comprising a pair of inexpensive plate circuit type double contact relays connected in series through a resistor shunted circuit including a resistor of pre-selected value to render one relay approximately half as sensitive as the other, and switching circuits controlled by said relays to supply current to one of a pair of opposed supply lines and a reversible motor connected to the opposed supply lines and adapted to drive the steering wheel of a marine vessel in one direction when both relays are energized, to disconnect both supply lines when the sensitive relay only is energized thereby rendering the motor inoperative and to supply current to the other of said pair of opposed supply lines and the reversible motor when both relays are deenergized to drive the steering wheel in the other direction.

Still another object of the present invention resides in providing a novel electrical control circuit for a magnetic compass comprising a variable condenser tuning circuit made up of three annularly spaced, arcuately curved stationary condenser plates two of which are diametrically opposed and electrically connected together and to a suitable oscillator tube circuit to form one side of a condenser circuit and the other of which lies intermediate of the connected two along an arc of a circle coinciding with the curvature of the plates and is connected to the oscillator tube circuit to form the other side of the condenser circuit and a movable condenser plate generally semi-circular in shape carried by the rotatable element of the compass in annularly spaced relation to said stationary plates to cooperate with the stationary plates and vary the current in the oscillator circuit in accord with the compass bearing.

Further objects and advantages of this invention will become apparent upon reference to the following specification, claims and drawings wherein:

Figure 1 shows an elevation of the automatic pilot of this invention applied to the helm of a boat;

Figure 1a is a fragmentary sectional view through the compass gear box showing one form of compass yoke journalling and its drive train;

Figure 2 is a horizontal section of the compass taken along the line 2—2 of Figure 3;

Figure 3 is a vertical section of the compass taken substantially along the center thereof;

Figure 4 is a circuit diagram of the oscillator and detector of this invention;

Figure 5 is a diagram of the relay and power unit;

Figure 6 is a graph showing the variation in plate current of the detector with a change in frequency of the oscillator;

Figure 7 is a diagram of another embodiment of the relay and power unit;

Figure 8 is a horizontal section of a further embodiment of a compass taken along the line 8—8 of Figure 9;

Figure 9 is a vertical section through a compass along substantially a central plane;

Figure 10 is a further graph of variation in detector plate current with variation in oscillator frequency; and Figure 11 is a further embodiment of a relay and power unit for obtaining variable rudder angle.

Referring more particularly to the figures of the drawing there is shown in Figure 1 a boat 10 having a helm 12 mounted on a standard 14. The helm 12 is provided with a gear 16 which is drivingly connected by means of a chain 18 to a drive gear, not shown. The drive gear is in turn actuated by the shaft 22 which has a bevel gear 24 mounted thereon in engagement with a mating bevel gear 26. The gear 26 is mounted on a shaft 28 which may be supported in any suitable manner such as by a bearing in bracket 30. The shaft 28 has mounted on its end thereof one plate 32 of a clutch 34 and this clutch plate 32 is actuatable by means of an arm 36 which is attached to clutch bar 38 hung in support 40 and actuated by clutch lever 42. The other plate 44 of the clutch 34 is carried by a shaft 46 supported by a bracket 48 and the shaft 46 carries on its end a bevel gear 50. The bevel 50 meshes with a further bevel 52 carried on a shaft 54 mounted in brackets 56 and driven by gear 58. The gear 58 is in turn driven by pinion 60 mounted on shaft 62 and fixed to gear 64. Gear 64 is driven by pinion 66 mounted on the shaft 68 of a reversible drive motor 70.

When the clutch lever 42 is in its left most position the two plates 32 and 44 of the clutch 34 are in engagement and the helm 12 is driven by the helm drive motor 70. When the clutch lever 42 is in its right most position the clutch 34 is disengaged and the helm 12 may be controlled manually.

Also shown in Figure 1 are a compass 72 and oscillator-detector unit 74. A power connection 76 is provided to supply power to the helm drive motor 70 and a power cable 78 provides the necessary power supply for the oscillator-detector unit 74. A flexible drive shaft 80 is provided from the gear box 19 to the compass 72 to provide follow-up motion in a manner presently to be described.

Referring to Figures 2 and 3 there is shown a compass fitted with the variable condenser pick-off of my invention. The compass unit includes the compass bowl 82 mounted in gimbels 84 and 86 and supported in yoke 88. The yoke 88 is rotatably mounted in suitable bearings in the compass gear box 90 and is driven by a step-down gear train within the compass gear box.

The compass 72 has mounted within the bowl 82 a conventional compass magnet assembly 92 to which is attached a metal vane 94 which has arcuate end plates 96 affixed to opposite ends thereof in a depending fashion. The magnet and vane assembly are mounted on the conventional compass pivot 98 and the arcuate plates 96 are preferably formed segments of a sphere which has its center at the pivot point 98. The vane 94 and plates 96 are maintained in a substantially fixed position relative to the earth by the normal compass action of the pivoted magnet assembly 92 but actually move relative to the bowl and outer plates 100.

A pair of outer arcuate electrodes 100 are mounted at diametrically opposed positions in the bowl 82 by any suitable means such as screws 102 which pass through the bowl 82 and through supporting members 104 on the interior of the bowl. The plates 100 are also segments of a sphere which has its center at the pivot point 98, the sphere of the outer plates 100 being larger in diameter than the sphere of the inner plates 96. As a further or an alternative method of securing the outer plates 100, such plates may be provided with upper outwardly extending flanges 106 which may be secured to the viewing glass 108 of the compass 72 as by means of rivets or screws 109.

In addition to forming the support for the outer plates 100 the screws 102 also serve as plate terminals to which suitable flexible leads 110 and 111 may be connected. The lead 111 is preferably a length of shielded cable with the shielding carried to a point very close to its terminal 102 on the compass bowl and the shielding is grounded to the compass yoke 88. The end of lead 111 opposite terminal 102 is connected to a spring 112 mounted on the yoke 88 by means of an insulator block 113 and one end of the spring 112 bears upon a vertical fixed spindle contact 114 which passes through the center of the stem 116 of the rotatable yoke 88. The other outer plate lead 110 may be connected as at 118 to the yoke 88 and then through the various metal connections to ground in the oscillator circuit. It will thus be seen that no electrical connection is made to the inner or movable plates 96 and thus relatively heavy currents may be flowed through the pick-off condenser.

Since the yoke 88 rotates under the influence of the follow-up mechanism some relatively movable connection is necessary between the conductor 111 and the oscillator input. It has been found that the spring and stationary vertical spindle assembly is economical and reliable and resists the corrosive effect of salt spray and sea water more effectively than conventional sliding contacts such as slip rings.

Reference to Figures 1, 2 and 3 will show that the condenser assembly of this invention may be attached to any conventional compass and that the vane 94 does not disturb the normal sensitive balance of the magnets 92 on the pivot 98, since, if made of light aluminum or the like as contemplated, the vane will be about the same weight as the conventional compass card it replaces. In a typical installation the vane 94 is approximately three inches in length and the depending inner plates 96 at either side thereof have an area of approximately three-fourths to one square inch. The two outer electrodes 100 in such an installation might be approximately one and one half square inches in area and might be spaced from the movable plates 96 approximately three thirty-seconds of an inch. With this arrangement it will be seen that the electrical capacity between the two outer electrodes 100 varies with the relative position of the inner plates 96 which are attached to the magnet assembly 92. The entire bowl 82 and sight glass 108 is liquid tight and filled with the customary compass liquid.

Upon reference to Figure 3 it will be seen that the vertical dimension of the movable electrodes 96 is considerably less than the vertical width of the outer electrodes 100. This particular construction coupled with the coincidence of the centers of the spheres of which the two sets of electrodes are segments permits a limited relative rolling and pitching motion between the inner and outer plates without any change in the capacitance between the outer electrodes. This results in a high electrical stability for the system and prevents any small jerking action imparted to the compass from introducing spurious response in the helm control system.

It will be seen from a reference to Figures 2 and 3 that the symmetry of the electrode arrangement makes it possible to obtain equal values of capacity at conjugate settings of the electrodes. In Figures 8 and 9 there is shown another embodiment of my invention wherein this duplicity of capacitance settings is eliminated. Thus referring to Figure 9 there is shown a compass bowl 120 having a cover plate or sight glass 122 and a magnet assembly 124 mounted on a pivot 126. With this embodiment of the invention there is provided a pair of oppositely disposed arcuate outer plates 128 and 130 which are electrically connected together and which may be fastened or mounted within the bowl 120 by means of mounting screws 132 and 134 passing through the cover plate 122. Between the electrodes 128 and 130 there is provided a third outer electrode 136 and each of the electrodes 128, 130 and 136 form segments of a sphere which has its center at the pivot point 126 as in the preceding embodiment. The magnet assembly 124 is provided with a semicircular shaped vane 138 which carries an elongated depending inner electrode 140 on one side thereof. The inner electrode 140 also forms a segment of a sphere having its center at the pivot point 126.

The vane 138 is provided with an overhanging portion 142 and is skeletonized opposite 142 so as to insure a gravitational balance of the vane and inner electrode on the pivot. This balance may be facilitated by positioning the magnet assembly 124 slightly away from the center opposite the skeletonized portion of the vane and electrode assembly. Smooth electrical passage through maximum capacity is provided with this type electrode arrangement since, in its rotation, the vane approaches one of the ground electrodes as it leaves the other and this yields a broad maximum capacity angle and a broad minimum capacity angle with steep change in between.

While the bowls 82 and 120, shown in Figures 3 and 9, have been described as being constructed of insulating material it is also possible to utilize the condenser of my invention with metal compass bowls. In such arrangements a larger compass is necessitated because of the capacitive shunting effect of the metal bowl across the condenser terminals. In a typical instance the change in capacitance between maximum and minimum in a compass actuated capacitor according to my invention will be approximately 4 micromicrofarads.

The compass actuated capacitor comprises the control element of my automatic pilot and is connected to the oscillator shown diagrammatically in Figure 4. The oscillator is a tuned-plate type oscillator having magnetic feed back and comprises a triode 144 whose plate 146 is connected to one terminal 148 of the compass actuated variable capacitance 150. The other plate 152 of said capacitance is connected to ground. The cathode 154 of tube 144 is connected to ground and a tank coil 156 is connected between the plate 146 and cathode 154 through a coupling and by-pass condenser 158. The condenser 158 completes the tank circuit and also helps prevent radio frequency signals from entering the plate supply. The large capacitances due to lead up through spindle 114 and the shielded lead from spring 112 to the vicinity of terminal 102, are lumped and indicated as equivalent dotted capacitance 160.

The grid 162 of tube 144 is connected through a coupling condenser 164 to a winding 166 which is magnetically coupled to the tank inductance 156, and which is thence connected to ground. The grid 162 is also connected to a grid resistor 164 which is connected to ground. Positive plate supply voltage for the oscillator is provided through a plate resistor 168 which is connected between the inductance 156 and capacitor 158. This positive supply lead is designated as 170 both in Figures 4 and 5.

Output from the tuned-plate oscillator is fed to a detector by means of a double-tuned transformer 172 of the type used in the IF stages of the sound section of television receivers having separate video and audio IF sections. This transformer is provided with a primary winding 174, secondary windings 176, primary condenser 178 and secondary condenser 180. The primary winding 174 is connected through a coupling condenser 182 to the plate 146 of the tube 144 while the other side of the primary winding is connected to ground. The oscillator output signal is then introduced by means of the secondary 176 to the grid 184 of a detector triode 186 which is connected for plate detection.

The cathode 188 of the tube 186 is connected to ground whereas the other side of the transformer secondary 176 is connected by means of a conductor 190 to a bias supply voltage which also serves as the filament supply for the tubes 144 and 186 over the line 192. This bias supply is shunted by a by-pass condenser 194 which is connected between the lower terminal of the secondary 176 and ground. The bias provided by conductor 190 is sufficient to bias the tube 186 approximately to cut off so that the radio frequency signal voltage applied to the grid of the tube gives pulses of plate current on the positive half cycles and no current on the negative cycles in a well known manner. The resultant average plate current is dependent upon the average amplitude of the applied signal. The plate 195 of the detector tube is connected by conductor 196 to the relay coil 198 in the relay and power unit shown in Figure 5 and the other side of this coil 198 is connected to the positive supply voltage through conductor 170.

The operation of this circuit is as follows. By means of the iron slug of the tank coil 156 the oscillator is tuned to a preselected frequency with the compass condenser 150 in its minimum capacity position, as for instance, to a frequency of 20 megacycles. If the variation in capacity of condenser 150 amounts to approximately three or four micromicrofarads and the capacity of the oscillator tank circuit is a total of approximately 45 micromicrofarads, movement of the condenser from minimum to maximum setting will increase the total tank capacitance by said three or four micromicrofarads giving an increase in total capacity of about 8% and this results in a decrease in frequency of approximately 4% to about 19.2 megacycles.

IF type transformer 172 may have its primary and secondary peaked to a frequency of 20 megacycles and may have a band width of approximately .5 megacycle. When the compass condenser 150 is at its minimum capacitance setting the oscillator is tuned to a frequency of 20 megacycles and the detector plate current of tube 186 has a value of, for example, 7 to 8 milliamperes as is shown graphically in Figure 6. When the compass condenser 150 is shifted to its maximum capacity setting, causing the oscillator to oscillate at a frequency of 19.2 megacycles, the signal passed through the transformer is greatly reduced and the detector plate current drops to less than one milliampere as is also shown graphically in Figure 6.

The relay coil 198 actuates a single pole, single throw relay 200 which has a pull-in current of, for example, approximately four milliamperes and a drop-out current of approximately 2 milliamperes. It will thus be seen on reference to Figure 6 that the required shift in oscillator frequency to cause a change in the plate current of the detector tube from the pull-in to the drop-out value is only a minor part of the total possible shift which occurs in oscillator frequency upon rotating the compass condenser 150 from its minimum to maximum capacitance position.

Referring now to Figure 5 there is shown in addition to the relay 200, the helm drive motor 70 and solenoid actuated mercury switches 202 and 204 which are actuated by solenoid 206 and dynamotor 208 which provides power for the oscillator-detector unit. Power for actuating the relay and power unit comes through lines 210 and 212 which are connected to the conventional D.C. supply found on small craft. It will be seen that the positive supply lead 210 is connected to the chassis or ground bus of the oscillator-detector unit shown in Figure 4 and supplies bias and filament voltage thereto, while the negative supply lead 212 is connected through an on-off switch 214 to a voltage dropping resistor 216 and thence to the bias and filament supply lead 192 for the oscillator-detector unit. Plate power for the tubes in the oscillator and detector unit is supplied by means of the dynamotor 208 which has its motor winding connected across the supply lines 210 and 212 through a voltage dropping resistor 218. The negative output lead 220 of the generator winding of the dynamotor 208 is connected to the ground bus 210 of the oscillator-detector unit while the positive output lead 222 of the dynamotor 208 is connected to the plate supply conductor 170 for the oscillator and to the coil 198 of the relay 200. The other side of this relay coil is connected through conductor 196 to the plate of the detector tube 186 to supply positive voltage thereto.

The relay 200 is provided with an armature 224 which engages stationary contact 226 to control the supply of actuating current to the coil 228 of the solenoid 206. Thus when the relay 200 is in its energized position the armature 224 does not contact the stationary contact 226 and no current is supplied to the winding 228 of the solenoid 206. When the coil 198 of the relay 200 is deenergized the circuit between armature 224 and contact 226 is closed and the coil 228 of solenoid 206 is supplied with current from the vessel's D.C. power supply thereby causing the armature 230 of solenoid 206 to be actuated. This causes the arm 232 to move the mercury switches 202 and 204 to cause one such switch to open and the other to close the circuits controlled thereby.

The mercury switches 202 and 204 are respectively connected in the forward and reverse windings of the helm drive motor 70 by means of conductors 234 and 236. Contact 235 in switch 202 is connected to contact 237 in switch 204 and the common lead is connected through conductor 238 to the positive supply line 210. The common connection 240 in the helm motor 70 is connected to the other vessel supply bus 212. Thus when solenoid 206 is in the energized position the drive motor 70 runs in one direction and when the solenoid 206 is deenergized the drive motor runs in the other direction. Thus it will be seen that as the capacitance of the compass condenser 150 is changed the frequency of oscillation of the oscillator tube 144 is varied causing a change in the plate current of the detector tube 186 which energizes or deenergizes the relay 200 to energize or deenergize the solenoid 206 to effect reversal of the helm drive motor 70.

The operation of this device is as follows: If the clutch 34 is disengaged so that the vessel is manually steered and if the compass condenser 150 is in its minimum capacitance condition a plate current of approximately 8 milliamperes flows in the plate circuit of the detector tube 186 thereby holding the contacts of relay 200 in the open position. Solenoid 206 does not receive power in this condition and thus the contacts of mercury switch 204 are closed causing the helm drive motor to operate in one direction, as for example, to tend to drive the rudder to the left. The outer plates 100, as shown in Figure 2, of the compass condenser 150 are simultaneously rotated in a counterclockwise direction by means of the follow-up flexible drive shaft 80. This causes an increase in the capacitance of compass capacitor 150 and a decrease in the frequency of oscillation of the oscillator tube 144 causing the plate current of the detector tube 186 to drop below the fall-out value for the relay 200. The contacts 224 and 226 of relay 200 thereupon close and solenoid 206 opens the previously closed mercury switch 204 and closes the previously open mercury switch 202 to reverse the direction of rotation of the drive motor 70. This reversal in the direction of rotation of the drive motor 70 then causes the plates 100 of the compass condenser 150 to be rotated in a clockwise direction causing a decrease in oscillator frequency and an increase in detector plate current sufficient to pull in the relay 200 and break the circuit to solenoid 206 thereby reclosing mercury switch 204 and reopening mercury switch 202. The drive motor then rotates in the opposite direction and the system oscillates continuously with a periodicity of two seconds or over depending on the size of the vessel.

This uniform oscillation continues when the clutch 34 is engaged provided the external conditions of sea, wind and current are tranquil and the boat remains on course. If the vessel deviates from the set course the side to side oscillations or hunting of the automatic pilot ceases to be symmetrical and results in the application of corrective rudder in repeating pilot cycles until symmetry of the side oscillations or hunting is restored by eliminating the deviation from the set compass course.

Thus if the clutch is engaged and the vessel is for some reason off course to the right the plates 100 are removed by a certain clockwise angle from their on course position. This causes an increase in the oscillator frequency and a pull-in of relay 200 to start the rudder moving to the left in a direction to correct the deviation from the true course. It will be seen that simultaneously with the movement of the rudder to the left the follow-up mechanism causes counterclockwise rotation of the plates 100 and the rudder continues to move to the left until the follow-up mechanism has brought the plates 100 to approximately their on course position thus completing a pilot cycle. That is to say the drive motor operates in that direction until the condenser 150 is in its maximum capacity position. When the follow-up returns the plates 100 to this position the frequency of the oscillator is again raised and the relay 200 is energized to cause the rudder to start to move to the right. Upon movement of the rudder to the right follow-up motion of the plates 100 occurs in a clockwise direction and lowers the frequency of the oscillator to the drop-out value in approximately the same time as when the clutch was disengaged or the vessel was on course and thus the magnitude of this rightward movement is small as compared to the previous leftward movement and takes place in from one to two seconds in smaller sized boats. Since the original leftward movement of the rudder continued until the follow-up mechanism had moved the plates 100 through the deviation angle the rudder still remains in a leftward position, and is slowly stepped back to a central position as the vessel corrects its deviation from the set course. That is to say, when the clutch is disengaged or when the vessel is operating in tranquil water on course, the time duration of the movement of the rudder to the left and of its movement to the right are equal and relatively short. When the clutch is engaged and the vessel is off course corrective rudder is applied until the follow-up mechanism moves the plates 100 through an angle corresponding to the deviation from the true course. During this movement of the plates 100 the rudder is moving toward corrective position and the time of this movement is longer than the normal movement of the rudder in that direction during on course hunting. The result is that corrective rudder is applied in an amount substantially proportional to the deviation from the set course and this corrective rudder is eased as the vessel approaches the set course.

In Figure 7 there is shown a modification of the relay and power unit of this invention which permits non-hunting type operation. In this figure similar reference symbols are utilized where they indicate the same parts as appeared in Figure 5. With this embodiment of the invention instead of the drive motor continuously oscillating or hunting back and forth there is a neutral setting of the relays in which there is no movement of the motor and this corresponds to the vessel being on course. If the vessel veers off course corrective rudder is applied to bring it back, but then the rudder operation ceases when the vessel has returned to the set course.

In order to accomplish this, additional contact 252 of relay 200 having its armature 224 connected to the winding 228 of the solenoid 206 is used in place of contact 226 and is connected to the armature 254 of a second relay 256, the contact 257 of which is connected to the negative vessel supply line 212. Thus when armatures 224 and 254 are in their lower positions corresponding to energization of the coils 198 and 258 of the relays a circuit is completed from the supply buses 210 and 212 to the coil 228 of solenoid 206.

The relay 200 is further provided with an additional armature 259 which cooperates with a contact 260 which is connected to the vessel's negative supply. The armature 259 together with second armature 268 of relay 256 is connected to the coil 262 of a second solenoid 264. The other side of the coil 262 of the solenoid 264 is connected by means of the conductor 266 to the positive vessel supply bus 210. The second armature 268 of relay 256 cooperates with a contact 270 connected to contact 260. As a consequence the upper terminal of coil 262 may be connected either through contact 260 or contact 270 to the vessel's negative supply.

The solenoid 264 is provided with an armature 271 and with an actuating arm 272 to operate a mercury switch 274. The mercury switch 274 has its terminals connected in series with the common terminals 276 and 278 of the mercury switches 202 and 204 and through conductor 280 to the positive vessel supply bus 210. Each relay thus has an upper and lower set of contacts which operate in unison. The lower sets of contacts of the relays are in series and control the solenoid operated double mercury switches 202 and 204. The upper sets of contacts control the single solenoid operated mercury switch 274 and this in turn controls the supply of main power to the steering motor 70. That is to say, if the mercury switch 274 is open all power is removed from the steering motor 70 so that it comes to rest. As in the previous modification the mercury switches 202 and 204 determine the direction of rotation of the motor 70 and if the switch 274 is maintained in the closed position the relay and power unit shown in Figure 7 operates in a manner similar to that shown in Figure 5.

The operation of this relay and power unit is as follows:

While the continuously oscillating type of relay and power unit shown in Figure 4 required in the given example a range of current variation from approximately 2 to approximately 4 milliamperes, which was brought about by the frequency shift of approximately .1 megacycle, the neutral type of three position relay and power unit shown in Figure 7 requires twice this current range, or from approximately 2 to approximately 6 milliamperes, which is brought about by a shift in oscillator frequency of approximately .2 megacycle. The diagram in Figure 6 indicates that this variation in current is available with the particular oscillator-detector arrangement shown in Figure 4.

It will be noted that the relay 256 in Figure 7 is shunted by a resistor 284. In operation this causes the relay 200 to be energized before the relay 256 and also causes the relay 256 to be deenergized before the relay 200. Thus for small currents in the detector plate circuit both relays are deenergized and the rudder moves in one direction, as for example to the left. For large currents, on the other hand, both relays are closed and the rudder is moved in the opposite direction or to the right. For detector plate currents in between these two extremes the relay 200 is closed while the relay 256 is deenergized so that no current flows through the mercury switch 274 and the pilot remains in its neutral condition with the motor 70 stationary.

Since a vessel's response to its helm largely depends upon the condition of the sea it is desirable to be able to adjust the magnitude of corrective rudder which is applied in any deviation from the set course. While according to my invention this may be done in several ways, that is, by varying the mechanical back lash in the follow-up drive between the steering motor and compass, by varying the relay adjustment to cause the make and break to occur at different values of detector current, or by varying the steepness in the slope of the side of the resonance curve, it has been found that this latter method is quite satisfactory.

The curve shown in Figure 6 is produced by having the primary and secondaries of the transformer 172 tuned to the same frequency. If the transformer is slightly detuned, that is if the secondary is tuned to a slightly different frequency from the primary, two unsymmetrical peaks are obtained in the curve and the side of the curve having the lower maximum has a smaller slope than either the tuned curve of the transformer or than the other side of the detuned curve. Thus in Figure 10 there is shown in dotted lines the effect of detuning the transformer whose tuned curve is shown in solid lines.

Recalling now the explanation of the operation of the relay and power unit shown in Figure 5 with the vessel on course or with the clutch 34 disengaged, the pilot system oscillates about a mean rudder position and about a mean frequency, the rudder moving in one direction until the oscillator frequency changes sufficiently to cause operation of the relays and then moving in the opposite direction. It will be seen from the dotted curve in Figure 10 that where the transformer is detuned a larger frequency variation is necessary in order to cause the same change in plate current in the detector circuit. Thus where the transformer is detuned as in Figure 10 a longer hunting period is caused by this increased frequency change to reverse the movement of the rudder. The same increase in rudder response is applicable to the operation of the system with the clutch engaged so that the rudder responds to the movement of the drive motor 70. If now the motor speed is increased to maintain a constant periodicity of hunting it will be obvious that the corrective rudder applied is greater so that for the same deviation in course an increased corrective rudder is applied.

This change in motor speed may be easily provided by the use of a rheostat in the motor supply (not shown). It will also be noticed that where the transformer 172 is detuned it is necessary to shift the mean frequency of the oscillator from F-2 as shown in Figure 10 to F-3. According to the invention there is provided a unitary control which simultaneously detunes the transformer 172, shifts the oscillator frequency to an appropriate value, and varies the motor speed to maintain a constant frequency of hunting.

In addition to the foregoing there is also shown in Figure 11 a method of adjusting the magnitude of corrective rudder by causing the make and break of the relay to occur at different values of detector current. Thus Figure 11 shows a section of the relay and power unit similar to that shown in Figure 5 wherein like reference symbols have been utilized to indicate the same parts. In this embodiment of the invention, however, the relay 200 is provided with an additional armature 300 and contacts 302 and the dynamotor 208 which supplied plate power to the oscillator-detector unit in Figure 5 has been replaced with a B battery 304. The lower contact 226 and armature 224 of the relay 200 are utilized for automatic steering as in the embodiment shown in Figure 5. The upper contact 302 is connected to a series connected resistor 306 and potentiometer 308 which is connected to the positive terminal of the B battery 304. The armature 300 is connected to the lead 196 which supplies plate voltage to the oscillator-detector unit. A switch 310 urged by a spring 312 into a closed position is provided at the left end of the potentiometer so that when the potentiometer reaches its maximum resistance position this switch is opened to eliminate the shunt across the coil 198 of the relay 200.

The series connected potentiometer 308 and resistor 306 are connected across the coil 198 of relay 200 only when the relay is in its normal or deenergized position. If the potentiometer and resistor were connected across the coil in both relay positions, the actuating current for the relay would be increased for both make and break so that the differential would be unchanged. However since the shunting resistance is across the coil only when the relay is open, fall-out or break current is unchanged while pull-in or make current is increased. Thus as the potentiometer resistance is decreased there is a greater difference between pull-in and fall-out current values and because of the slope of the resonance curve of Figure 6 this increases the time that the steering motor operates during a given stroke and thereby increases the rudder angle. Conversely when the potentiometer resistance is increased the shunting effect across the coil is decreased and pull-in and fall-out current values come closer together. The switch 310 at the end of the motion of the potentiometer arm 315, that is, at its maximum resistance value, is opened by insulating projection 316 abutting switch 310 when an attempt is made to set the potentiometer beyond its maximum resistance and this switch may be utilized as an on-off switch for inserting or removing the variable rudder angle control.

As a specific example of the variation in pull-in and fall-out differential possible with this type of control, the ordinary pull-in and fall-out values of the relay 200 are 4 and 2 milliamperes respectively. However with a resistance of ten thousand ohms shunted across the coil 198, that is, with a ten thousand ohm potentiometer in its minimum resistance position, and a resistance 306 of ten thousand ohms, the pull-in and fall-out current values are respectively 6 and 2 milliamperes, indicating an approximate increase of 100% in corrective rudder angle.

A suitable drive connection between the flexible shaft 80 and the compass yoke is illustrated in detail in Figure 1a. As there shown, the yoke 88 is fixed as by a set screw 316 to the upper end of a vertically extending spindle 318 which is rotatably mounted within the gear box 90 by radial and thrust bearings, which may be conventional forms of anti-friction bearings or plain bearings as shown. A worm gear 320 is fixed to the spindle 318 within the gear box 90 and is in constant meshing engagement with a worm 322 journalled within gear box 90 and drivingly connected to the flexible shaft 80. A tubular electrical insulator 324 extends through the spindle 318 and is fixed at its lower end to the bottom wall of the gear box 90. The fixed spindle contact 114 is mounted upon the top of the tubular insulator 324 and electrically connected by a suitable electrical conductor 326 extending through insulator 324 to the oscillator circuit shown in Figure 4.

From the foregoing it will be seen that I have provided a simple automatic pilot, economical of construction, fool-proof in operation, and possessed of extreme ruggedness and durability. Simple electronic and relay circuits are utilized using a minimum number of tubes and components so that maintenance and repairs to the system are relatively simple. In addition a novel condenser type control component has been provided which makes possible adaptation of my automtaic pilot system to vessels of any size.

Whereas certain values of current, frequency and period of oscillation have been mentioned in the specification in the interest of clarity, it will be understood that these are illustrative only and are not to be deemed limiting in any sense.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A helm control pick-off condenser for mounting on a mariner's compass having a bowl and a pivoted magnet assembly, comprising in combination three capacitors arranged for connection in series parallel circuit relation between the terminals on the compass bowl, said capacitors being formed by a pair of horizontally aligned diametrically arranged plates fixed to said bowl and electrically connected together, a third plate fixed to said bowl in horizontal alignment with said first pair of plates and electrically insulated therefrom, said first three plates being arcuate and forming segments of a first sphere centered on the pivot point of said magnet assembly, and a fourth elongated arcuate plate fixed to said magnet assembly and horizontally aligned with said first three plates, said fourth plate forming a segment of a second sphere concentric with said first sphere and of a smaller diameter and having a sufficient length to arcuately span the distance between said fourth plate and either of said plates in said pair of plates so as to produce a variation in capacity between said fourth plate and said commonly connected pair of plates upon rotation of said magnet assembly, the sole external electrical connection to said fourth plate being capacitive coupling.

2. An automatic pilot comprising in combination; a magnetic compass, a variable condenser assembly comprising at least one pair of serially connected variable capacitors disposed within and actuated by said compass, a variable frequency oscillator connected to and having its frequency controlled by said condenser assembly, a detector connected to and receiving an input from said oscillator which is a function of said oscillator frequency, a relay directly controlled by said detector, a helm drive motor, and means actuated by said relay for controlling the operation of said motor.

3. An automatic pilot comprising in combination; a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for controlling the frequency thereof, a detector receiving an input signal from said oscillator which is a function of said oscillator frequency, a relay directly controlled by said detector, a helm drive motor, and means actuated by said relay for controlling the operation of said motor.

4. An automatic pilot comprising in combination; a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for controlling the frequency thereof, a detector having a tuned input signal circuit directly coupled to said oscillator for furnishing a detector output which is a function of the oscillator frequency, a relay in the plate circuit of said detector, a helm drive motor, and means actuated by said relay for controlling the operation of said motor.

5. An automatic pilot comprising in combination; a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for varying the frequency thereof, a detector having a tuned input circuit directly coupled to said oscillator for furnishing a detector output which is a function of the oscillator frequency, a relay in the plate circuit of said detector, a reversible helm drive motor, and switch means actuated by said relay for determining the direction of rotation of said motor.

6. An automatic pilot comprising in combination, a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for varying the frequency thereof, a detector having a tuned input circuit directly coupled to said oscillator for furnishing a detector output which is a function of the oscillator frequency, a relay in the plate circuit of said detector, a reversible helm drive motor, a solenoid actuated by said relay, and switch means actuated by said solenoid for determining the direction of rotation of said motor.

7. An automatic pilot as set out in claim 6 wherein said relay is shunted with a variable resistance for determining its make and break current values.

8. An automatic pilot as set out in claim 6 wherein the coupling between said oscillator and detector includes means for varying the change in detector plate current which follows a given change in oscillator frequency.

9. An automatic pilot as set out in claim 8 wherein said means comprises a double tuned coupling transformer.

10. An automatic pilot comprising in combination; a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for varying the frequency thereof, a detector having a tuned input circuit directly coupled to said oscillator for furnishing a detector output which is a function of the oscillator frequency, a pair of relays in the plate circuit of said detector, means associated with said relays to cause both to be deenergized at low currents, both to be energized at high currents and one to be energized at intermediate currents, a helm drive motor, and means actuated by said relay to cause said motor to rotate in one direction when both relays are energized, to rotate in the opposite direction when both relays are deenergized and to remain stationary when only one relay is energized.

11. An automatic pilot comprising in combination; a magnetic compass, a variable condenser assembly comprising at least one pair of serially connected variable capacitors disposed within and actuated by said compass and having a pair of terminals connected to stationary plates of said capacitors, a variable frequency oscillator, means connecting said condenser assembly through said terminals to the frequency control circuit of said oscillator for varying the frequency thereof, a detector receiving an input from said oscillator which is a function of said oscillator frequency, a relay directly controlled by said detector, a helm drive motor, means actuated by said relay for controlling the operation of said motor, and mechanical power transmitting means actuated by said motor and imparting a rotational follow-up motion to said stationary plates of said capacitors.

12. An automatic pilot comprising in combination; a magnetic compass, a variable condenser actuated by said compass and having a pair of capacitor elements mounted on a support and at least a single capacitor element affixed to the movable portion of said compass and movable in relation to said pair of capacitor elements to form therewith a pair of serially connected variable capacitors, a variable frequency oscillator, means connecting said pair of plates to the frequency control circuit of the oscillator for controlling the frequency thereof, a detector receiving an input from said oscillator which is a function of said oscillator frequency, a relay directly controlled by said detector, a helm drive motor, means actuated by said relay for controlling the operation of said motor, mechanical power transmitting means actuated by said motor and driving said helm and imparting a follow-up motion for said variable condenser, said last named means including gear means, and a power transmitting element driven by said gear means and driving said support for said pair of plates to provide follow-up motion for said variable condenser.

13. An automatic pilot as set out in claim 12 wherein said gear means and said power transmitting element are so arranged as to cause said support to rotate in a certain direction upon rotation of said motor in one direction and to cause said support to rotate in an opposite direction on rotation of said motor in an opposite direction.

14. An automatic pilot as set out in claim 13 wherein said power transmitting element comprises a flexible drive cable.

15. An automatic pilot comprising in combination; a compass, a variable condenser actuated by said compass and having a pair of capacitor elements mounted on a support and at least a single capacitor element affixed to the movable portion of said compass and movable in relation to said pair of capacitor elements to form therewith a pair of serially connected variable capacitors, a variable frequency oscillator, means connecting said pair of plates as the variable capacitance in the frequency control circuit of said oscillator, a padding capacitor for adjusting the frequency of said control circuit, a detector having a double tuned transformer input circuit directly coupled to said oscillator, a relay in the plate circuit of said detector, a reversible helm drive motor, a solenoid actuated by said relay, switch means actuated by said solenoid for determining the direction of rotation of said motor, mechanical power transmitting means actuated by said motor and driving said helm and imparting a follow-up motion for the support mounted capacitor elements of said variable condenser, and means controlling the speed of said motor.

16. An automatic pilot as set out in claim 15 including a unitary rudder angle control means for simultaneously varying the capacity of said padding condenser, varying the tuning of said double tuned transformer and adjusting said means for controlling the speed of said motor.

17. In combination with a gimbal mounted mariner's compass having a bowl and a magnetic element universally pivoted in said bowl means comprising three capacitors arranged in series parallel circuit relation between the terminals on the compass bowl and providing a capacitive indication of the relative rotative position only between said compass bowl and magnetic element whereby rolling and pitching movement between said magnetic element and said compass bowl effects no material variations in capacitance, said capacitive indication providing means including an electrically insulated capacitor element movable with said magnetic element and electrically coupled to the remainder of said capacitive indication providing means solely by capacitive coupling.

18. In combination with a gimbal mounted mariner's compass having a compass bowl and a magnetic element universally pivoted therein, an electrically conductive element mounted in fixed relation to said magnetic element, a pair of electrically interconnected electrical connections fixed relative to said bowl at symmetrically spaced points about the magnetic element pivot axis, a further connection fixed relative to said bowl at a point circumferentially disposed intermediate said pair of terminals, a pair of variable circuit elements connected in parallel between said pair of connections and said conductive element, and a further variable circuit element connected between said further connection and said conductive element, said variable circuit elements being variable in response to relative movements between said bowl and said magnetic element and the sole material electrical connection between said conductive element and said connections being through said variable circuit elements.

19. The combination defined in claim 18 wherein all of said variable circuit elements are variable capacitors, each having one capacitor element fixed relative to said magnetic element and a second capacitor element fixed relative to said bowl.

20. An automatic pilot comprising a magnetic compass having a housing and a magnetic element rotatably mounted thereon, a variable condenser assembly comprising at least a pair of serially connected variable capacitors disposed within and actuated by said compass, a drive mechanism, and means responsive to variations in the capacitance of said capacitors for controlling the operation of said drive mechanism, each of said capacitors comprising a first element fixed relative to said magnetic element of said compass and a second element fixed relative to said housing, the sole material electrical connection between said responsive means and said first elements of said capacitors being through capacitive coupling to the second element of said capacitors, said responsive means including a variable frequency oscillator connected to and having its frequency controlled by said condenser, and a tuned band pass circuit connected to the output of said oscillator for producing a control signal variable in magntiude in response to variations in the capacitance of said condenser.

21. In combination, an input element mounted for movement about a predetermined axis; a variable condenser assembly comprising at least one pair of serially connected variable capacitors actuated by movement of said input element and having a pair of terminals connected to stationary plates of said capacitors; a variable frequency oscillator; means connecting said condenser assembly through said terminals to the frequency control circuit of said oscillator for varying the frequency thereof, a detector having a fixed frequency input circuit coupled to said oscillator for furnishing a detector output which is a function of the oscillator frequency; a control device connected to said detector and operative to three distinct states in response respectively to a low amplitude output from said detector, an intermediate amplitude output from said detector and a high amplitude output from said detector, a reversibly movable output element, and means actuated by said control device to cause said reversibly movable output element to move in one direction when said control device is in one of said three states, to move in the opposite direction when said control device is in a second of said three states and to remain stationary when said control device is in a third of said three states.

22. In combination, an input element mounted for movement about a predetermined axis, a variable condenser assembly comprising at least one pair of serially connected variable capacitors actuated by movement of said input element and having a pair of terminals connected to stationary plates of said capacitors, a variable frequency oscillator, means connecting said condenser assembly through said terminals to the frequency control circuit of said oscillator for varying the frequency thereof, a detector having a fixed frequency input circuit directly coupled to said oscillator for furnishing a detector output which is a function of the oscillator frequency, a pair of circuit devices in the plate circuit of said detector, means associated with said circuit devices to cause both to be in a first operative state at low currents, both to be in a second operative state at high currents and one to be in each of said operative states at intermediate currents, a reversibly movable element, and means actuated by said circuit devices to cause said reversibly movable element to move in one direction when both of said circuit devices are in said first operative states, to move in the opposite direction when both circuit devices are in said second operative state and to remain stationary when one of said circuit devices is in each of said operative states.

23. In combination, a variable condenser assembly comprising at least one pair of serially connected variable capacitors, said variable capacitors each comprising a fixed plate and a movable plate and the movable plates of said capacitors being connected for unitary movement, means for variably positioning said movable plates relative to said fixed plates, an output device, and means responsive to variation in the capacitance across said serially connected variable capacitors for controlling the operation of said output device, said responsive means including a variable frequency oscillator connected to and having its frequency controlled by the capacitance across said serially connected variable capacitors, and a fixed frequency responsive network connected to the output of said oscillator for producing a control signal variable in magnitude in response to variations in the capacitance across said pair of serially connected variable capacitors.

24. In combination, an input element mounted for movement about a predetermined axis, a variable condenser assembly comprising at least a pair of serially connected variable capacitors, each of said capacitors having a movable plate connected to said input element for movement therewith, an output device, and means responsive to variation in the capacitance across said capacitors in series for controlling the operation of said output device, the sole material electrical connection between said responsive means and the movable plates of said capacitors being through the capacitive coupling to to the fixed plates of said capacitors, said responsive means including a variable frequency oscillator connected to and having its frequency controlled by the capacitance of said capacitors in series, and a fixed frequency responsive network connected to the output of said oscillator for producing a control signal variable in magnitude in response to variations in the capacitance of said capacitors in series.

25. In combination, a variable condenser assembly comprising at least a pair of serially connected variable capacitors each of said capacitors comprising a first element and a second element, said first elements being fixed, said second elements being interconnected for concomitant movement and directly electrically interconnected, means for imparting movement to said second element to vary the capacitance across said serially connected capacitors, a variable frequency oscillator connected to and having its frequency controlled by the capacitance across said serially connected variable capacitors, a fixed frequency responsive network connected to the output of said oscillator for producing a control signal variable in magnitude in response to variations in the capacitance across said serially connected variable capacitors, and a movable output element connected to the output of said fixed frequency network and movable in response to variations in the magnitude of said control signal.

26. In combination with a compass having a universally pivoted magnetic element disposed within a casing, means comprising a pair of simultaneously variable capacitors arranged in parallel circuit relation and connected in series with a further simultaneously variable capacitor between a pair of terminals on said casing providing a capacitive indication between said terminals of the relative rotative position between said casing and said magnetic element distinct to each such relative position.

References Cited in the file of this patent

UNITED STATES PATENTS

| | | |
|---|---|---|
| 1,982,702 | Sperry | Dec. 4, 1934 |
| 2,111,442 | West | Mar. 15, 1938 |
| 2,334,704 | Hilferty | Nov. 23, 1943 |
| 2,407,536 | Chapman | Sept. 10, 1946 |
| 2,490,735 | Kliever | Dec. 6, 1949 |
| 2,816,448 | Dixson | Dec. 17, 1957 |
| 2,866,146 | Rodriquez | Dec. 23, 1958 |